United States Patent
Lim et al.

(10) Patent No.: US 7,306,362 B2
(45) Date of Patent: Dec. 11, 2007

(54) FOOD PROCESSOR WITH A TRANSMISSION DEVICE

(75) Inventors: Chin-Kok Lim, Taichung (TW); Chuan-Hsien Weng, Chiayi Hsien (TW); Chien-I Tang, Taipei Hsien (TW)

(73) Assignee: Tsann Kuen Enterprise Co., Ltd., Taipei (TW)

( * ) Notice: Subject to any disclaimer, the term of this patent is extended or adjusted under 35 U.S.C. 154(b) by 0 days.

(21) Appl. No.: 11/471,177

(22) Filed: Jun. 20, 2006

(65) Prior Publication Data
US 2007/0030758 A1 Feb. 8, 2007

(30) Foreign Application Priority Data
Aug. 4, 2005 (CN) ........................ 2001 1 0044214

(51) Int. Cl.
*A47J 43/044* (2006.01)
(52) U.S. Cl. ...................... 366/201; 366/222; 464/153
(58) Field of Classification Search .......... 366/92–100, 366/197–207, 222–224; 464/153, 162, 167
See application file for complete search history.

(56) References Cited

U.S. PATENT DOCUMENTS

| | | | | |
|---|---|---|---|---|
| 1,119,572 A | * | 12/1914 | Butler | ........................ 464/153 |
| 1,732,354 A | * | 10/1929 | Cooper | ....................... 464/153 |
| 1,867,243 A | * | 7/1932 | Valdemar | ...................... 366/95 |
| 2,681,552 A | * | 6/1954 | Olson | .......................... 464/153 |
| 3,749,373 A | * | 7/1973 | Kemper | ...................... 366/76.6 |
| 4,325,643 A | * | 4/1982 | Scott et al. | ................. 366/200 |
| 4,720,194 A | * | 1/1988 | Friedland | ..................... 366/221 |
| 5,911,505 A | * | 6/1999 | St. John et al. | ............. 366/200 |
| 6,761,477 B2 | * | 7/2004 | Hallar et al. | ................. 366/207 |
| 2007/0030758 A1 | * | 2/2007 | Lim et al. | ..................... 366/200 |

FOREIGN PATENT DOCUMENTS

DE 3332465 A1 * 3/1984
GB 2134000 A * 8/1984

* cited by examiner

*Primary Examiner*—Charles E. Cooley
(74) *Attorney, Agent, or Firm*—Ladas & Parry LLP

(57) ABSTRACT

A food processor includes a drive unit, a food processing tool driven rotatably by the drive unit, a rotary support, and a transmission device. The transmission device includes a first transmission unit driven rotatably by the drive unit and defining a first drive axis, a second transmission unit driving rotation of the rotary support and defining a second drive axis, and a coupling member that couples the first transmission unit to the second transmission unit. The coupling member permits movement of the first transmission unit relative to the second transmission unit from a first position, where the first drive axis is aligned with the second drive axis, to a second position, where the first drive axis forms an angle with the second drive axis. The coupling member enables transmission of drive power from the drive unit to the rotary support when the first transmission unit is at the first position.

14 Claims, 7 Drawing Sheets

US 7,306,362 B2

FOOD PROCESSOR WITH A TRANSMISSION DEVICE

CROSS-REFERENCE TO RELATED APPLICATION

This application claims priority of Chinese Application No. 200510044214.X, filed on Aug. 4, 2005.

BACKGROUND OF THE INVENTION

1. Field of the Invention

The invention relates to a food processor, more particularly to a food processor for whisking.

2. Description of the Related Art

A conventional food processor for whisking usually includes a base that is adapted to support a container containing food to be processed, and that has a transmission unit coupled to a first drive unit and adapted to drive rotatably the container. A food processing tool, normally being at least one beater, is disposed above the base and is adapted to extend into the container such that the food in the container can be whisked by the beater. The beater is coupled to and driven rotatably by a second drive unit in a direction reverse to the rotation of the container so as to increase the efficiency in whisking the food.

In order to have easy access to the container, the conventional food processor is designed to allow the beater to be movable away from the base such that the container can be removed from or placed on the base without being blocked by the beater. However, because the conventional food processor includes the first and second drive units that are respectively disposed in upper and lower housing parts of the conventional food processor and that drive the respective one of the beater and the transmission unit of the base in opposite directions to each other, the drawbacks of higher production costs and higher power consumption are encountered.

There is another conventional food processor, in which only one drive unit for driving the beater is used, such that production cost and power consumption are both reduced. However, since the container is no longer driven rotatably, the whisking efficiency of the conventional food processor is not satisfactory.

SUMMARY OF THE INVENTION

Therefore, the object of the present invention is to provide a food processor provided with a transmission device that is capable of transmitting drive power to various parts of the food processor.

According to the present invention, there is provided a food processor that includes a drive unit, a food processing tool driven rotatably by the drive unit, a rotary support disposed below the food processing tool, and a transmission device. The transmission device includes a first transmission unit coupled to and driven rotatably by the drive unit, a second transmission unit coupled to the rotary support for driving rotation of the rotary support, and a coupling member that couples the first transmission unit to the second transmission unit. The first transmission unit defines a first drive axis, and the second transmission unit defines a second drive axis. The coupling member permits movement of the first transmission unit relative to the second transmission unit from a first position, where the first drive axis is aligned with the second drive axis, to a second position, where the first drive axis forms an angle with the second drive axis.

The coupling member enables drive power from the drive unit to be transmitted to the rotary support through the first transmission unit, the coupling member, and the second transmission unit when the first transmission unit is at the first position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
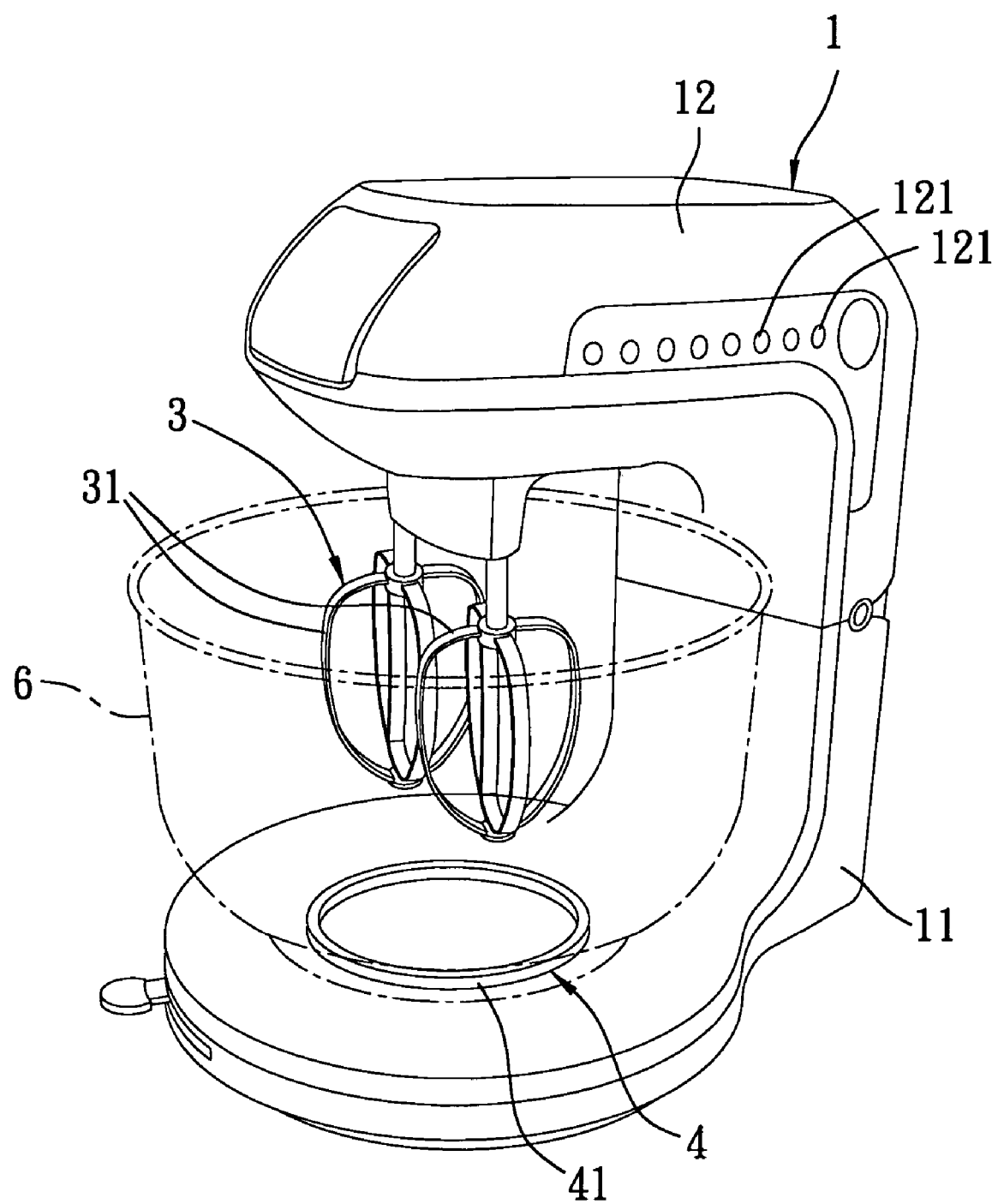
FIG. 1 is a perspective view of the preferred embodiment of a food processor according to the present invention, illustrating the outer appearance of a housing.
Figure 2:
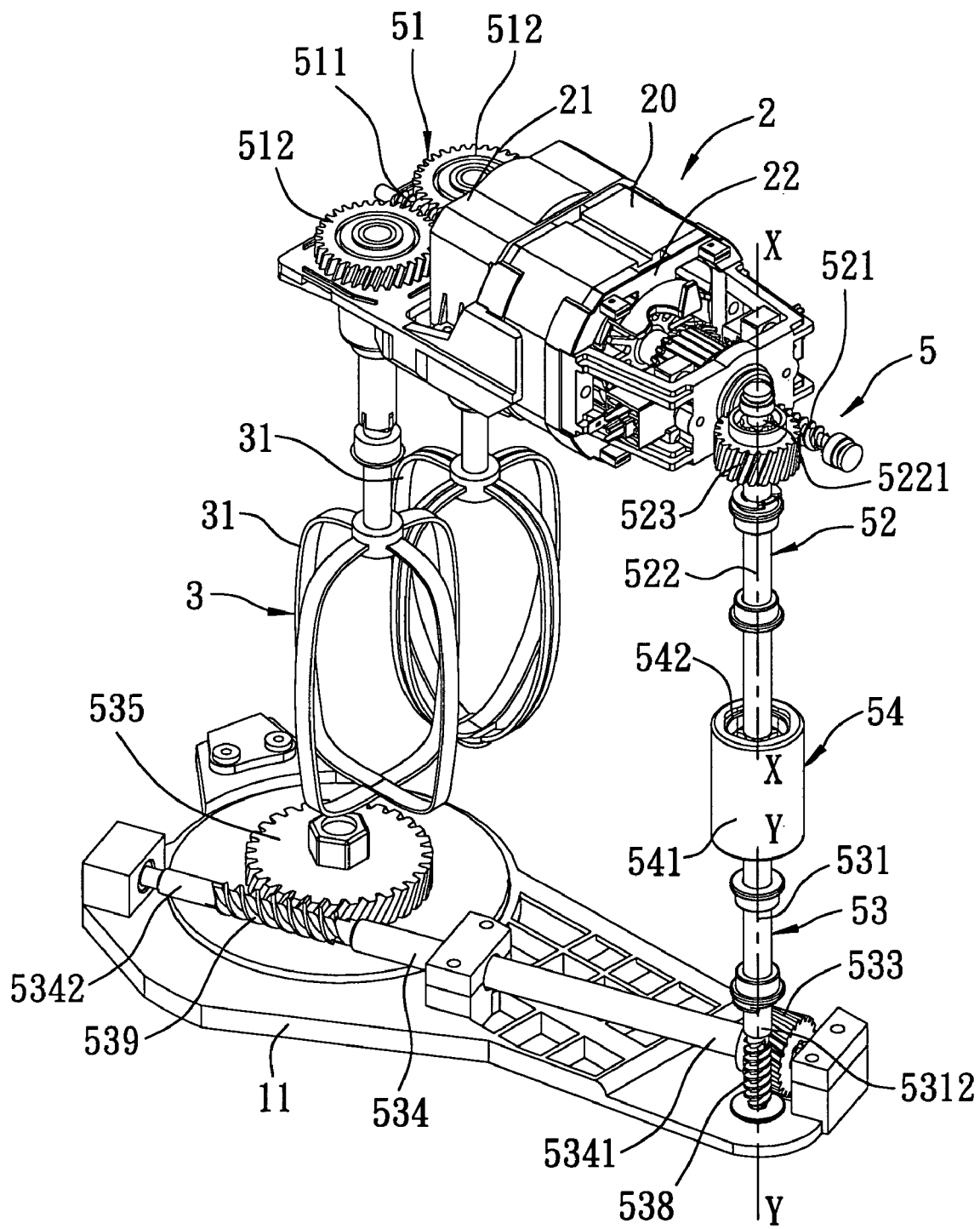
FIG. 2 is a fragmentary assembled perspective view of the preferred embodiment, with the housing removed to illustrate internal components of the preferred embodiment.
Figure 3:
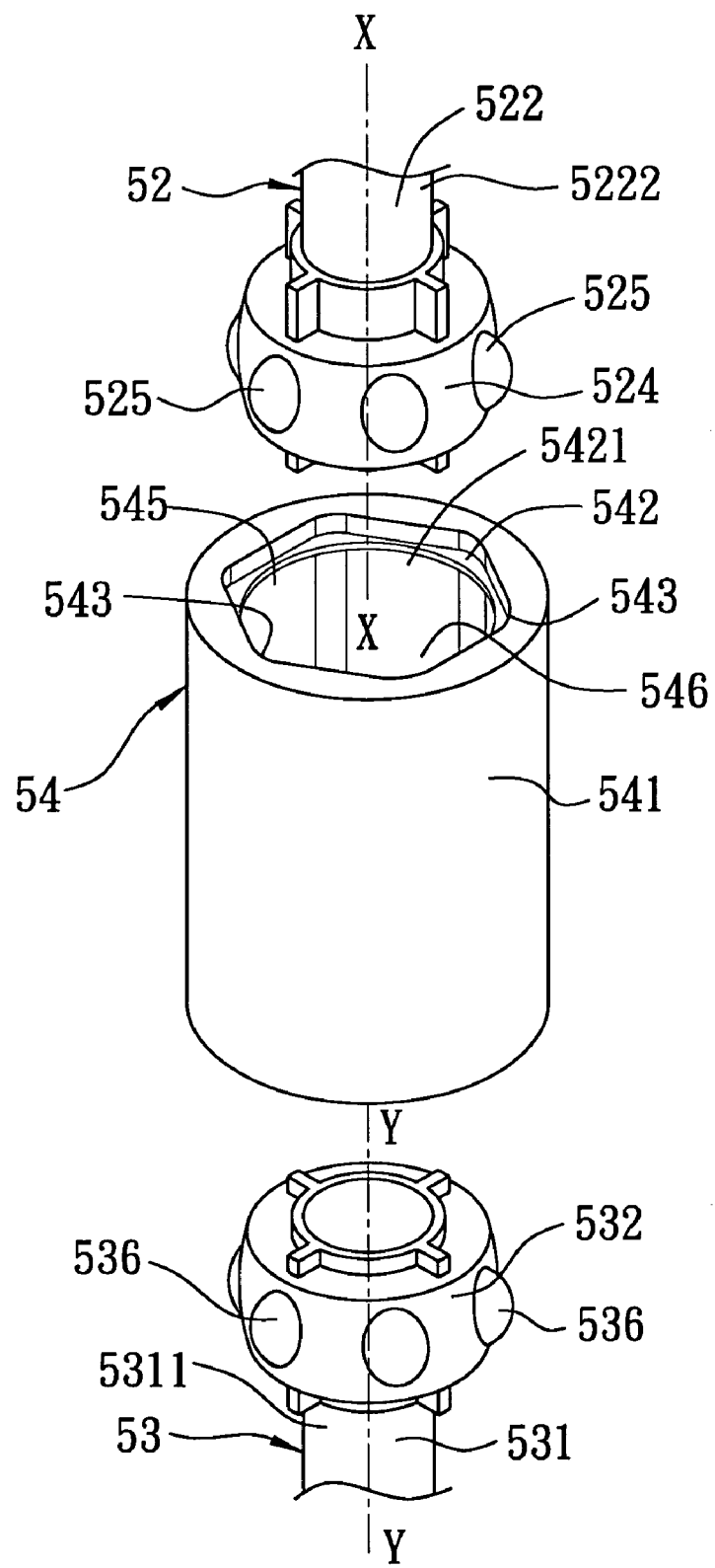
FIG. 3 is an enlarged fragmentary exploded perspective view of the preferred embodiment, illustrating the structural relationship among first and second transmission units and a coupling member of a transmission device.

As shown in FIGS. 1 to 3, the preferred embodiment of a food processor according to the present invention includes a housing 1, a drive unit 2, a food processing tool 3, a rotary support 4, and a transmission device 5.

Figure 6:
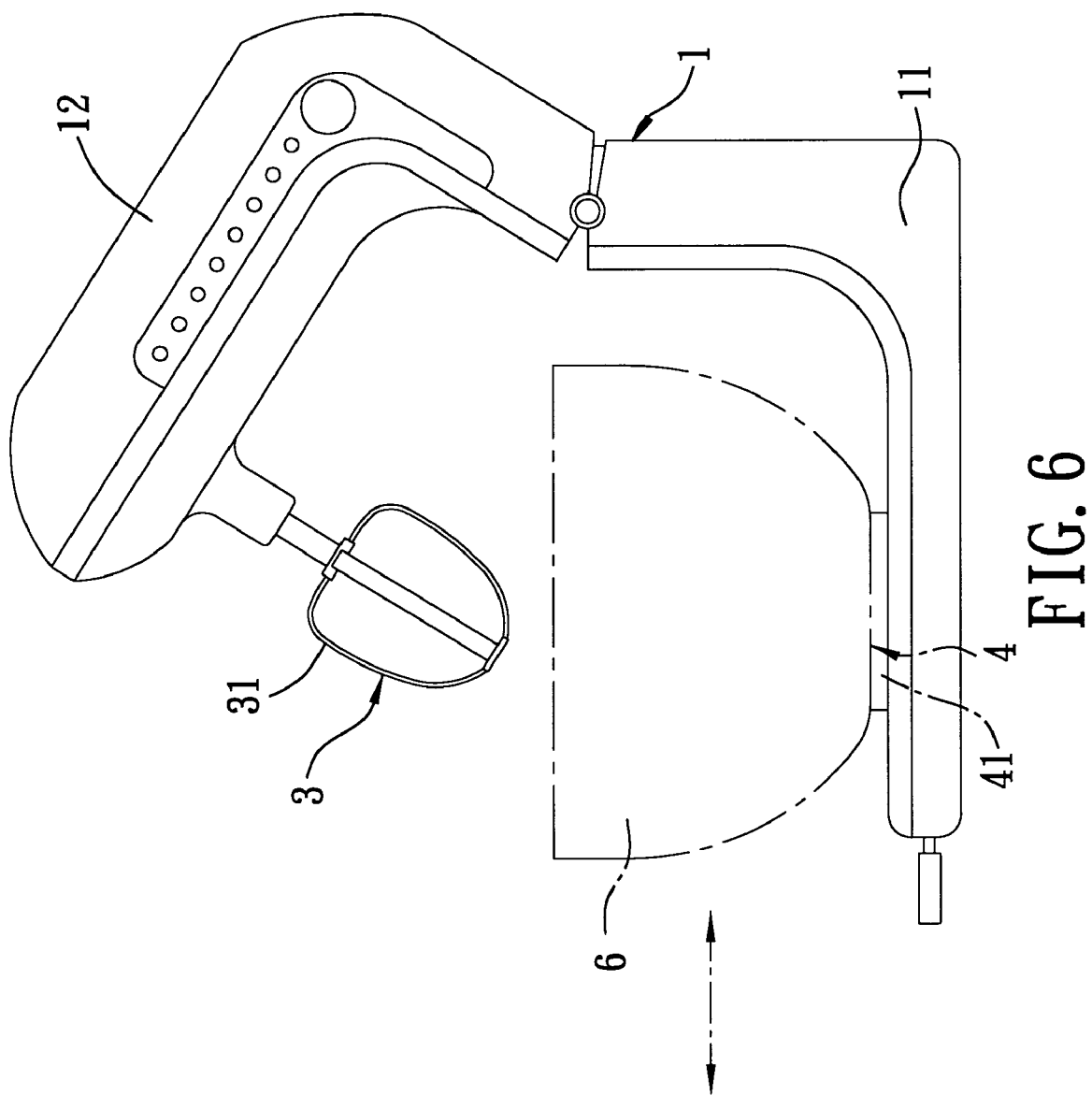
FIG. 6 is a schematic view of the preferred embodiment, illustrating the housing in a second state, where the first transmission unit is at a second position.

The housing 1 has the drive unit 2 and the transmission device 5 disposed therein, and includes a generally L-shaped lower housing portion 11, and a generally L-shaped upper housing portion 12 connected pivotally to the lower housing portion 11 and movable relative to the lower housing portion 11 from a first state (see FIG. 1) to a second state (see FIG. 6). The upper housing portion 12 has a plurality of control buttons 121 mounted thereon to enable user control of the drive unit 2. Since the feature of this invention does not reside in the structure or outer appearance of the housing 1, further details of the same are omitted herein for the sake of brevity.

The drive unit 2 includes a motor 20, and is disposed in the upper housing portion 12 of the housing 1. The drive unit 2 has front and back portions 21, 22.

The food processing tool 3 is disposed below the upper housing portion 12, is driven rotatably by the drive unit 2, and includes two beaters 31. It should be noted herein that one beater 31 would be sufficient for whisking in other embodiments of the present invention. In addition, the shape and type of the food processing tool 3 are not limited to the beaters 31 of this embodiment. In other words, the feature of this invention does not reside in the number, shape, or type of the food processing tool 3, so they should not limit the scope of the present invention.

The rotary support 4 is disposed on the lower housing portion 11 below the food processing tool 3, and includes a rotary disk 41 adapted to engage a container 6 containing food to be processed. Since the particular engagement between the rotary disk 41 and the container 6 is not a feature of the present invention, further details of the same will not be provided herein.

The transmission device 5 is disposed in the housing 1, and includes a first transmission unit 52 coupled to and driven rotatably by the drive unit 2, a second transmission unit 53 disposed below the first transmission unit 52 and coupled to the rotary support 4 for driving rotation of the rotary support 4, a third transmission unit 51 coupled to the drive unit 2 and the food processing tool 3, and a coupling member 54 that couples the first transmission unit 52 to the second transmission unit 53. The first transmission unit 52 defines a first drive axis (X), and the second transmission unit 53 defines a second drive axis (Y). The coupling member 54 permits movement of the first transmission unit 52 relative to the second transmission unit 53 from a first position (see FIG. 4), where the first drive axis (X) is aligned with the second drive axis (Y), to a second position (see FIG. 7), where the first drive axis (X) forms an angle with the second drive axis (Y). The first transmission unit 52 is at the first position when the upper housing portion 12 is in the first state (see FIG. 1), and at the second position when the upper housing portion 12 is in the second state (see FIG. 6).

The first transmission unit 52 is disposed in the upper housing portion 12 proximate to the back portion 22 of the drive unit 2. The first transmission unit 52 includes a first drive shaft 522 that extends along the first drive axis (X) and that has first top and bottom ends 5221, 5222, a first bearing component 524 mounted to the first bottom end 5222 of the first drive shaft 522, a first worm 521 that is coupled to and driven rotatably by the drive unit 2, and a first worm gear 523 that is mounted on the first top end 5221 of the first drive shaft 522 and that meshes with the first worm 521.

The second transmission unit 53 is disposed in the lower housing portion 11, and includes a second drive shaft 531 that extends along the second drive axis (Y) and that has second top and bottom ends 5311, 5312, a second bearing component 532 that is mounted to the second top end 5311 of the second drive shaft 531, a transmission shaft 534 that has a first portion 5341 provided with a second worm gear 533 and a second portion 5342 provided with a third worm 539, a second worm 538 that is provided on the second bottom end 5312 of the second drive shaft 531 and that meshes with the second worm gear 533, and a third worm gear 535 that meshes with the third worm 539 and that is connected to the rotary disk 41 of the rotary support 4.

The third transmission unit 51 is disposed in the upper housing portion 12 proximate to the front portion 21 of the drive unit 2. The third transmission unit 51 includes a fourth worm 511 that is coupled to and driven rotatably by the drive unit 2, and two fourth worm gears 512 that mesh with the fourth worm 511 and that are respectively connected to the beaters 31 of the food processing tool 3, thereby transmitting the drive power of the drive unit 2 to the food processing tool 3.

Figure 4:
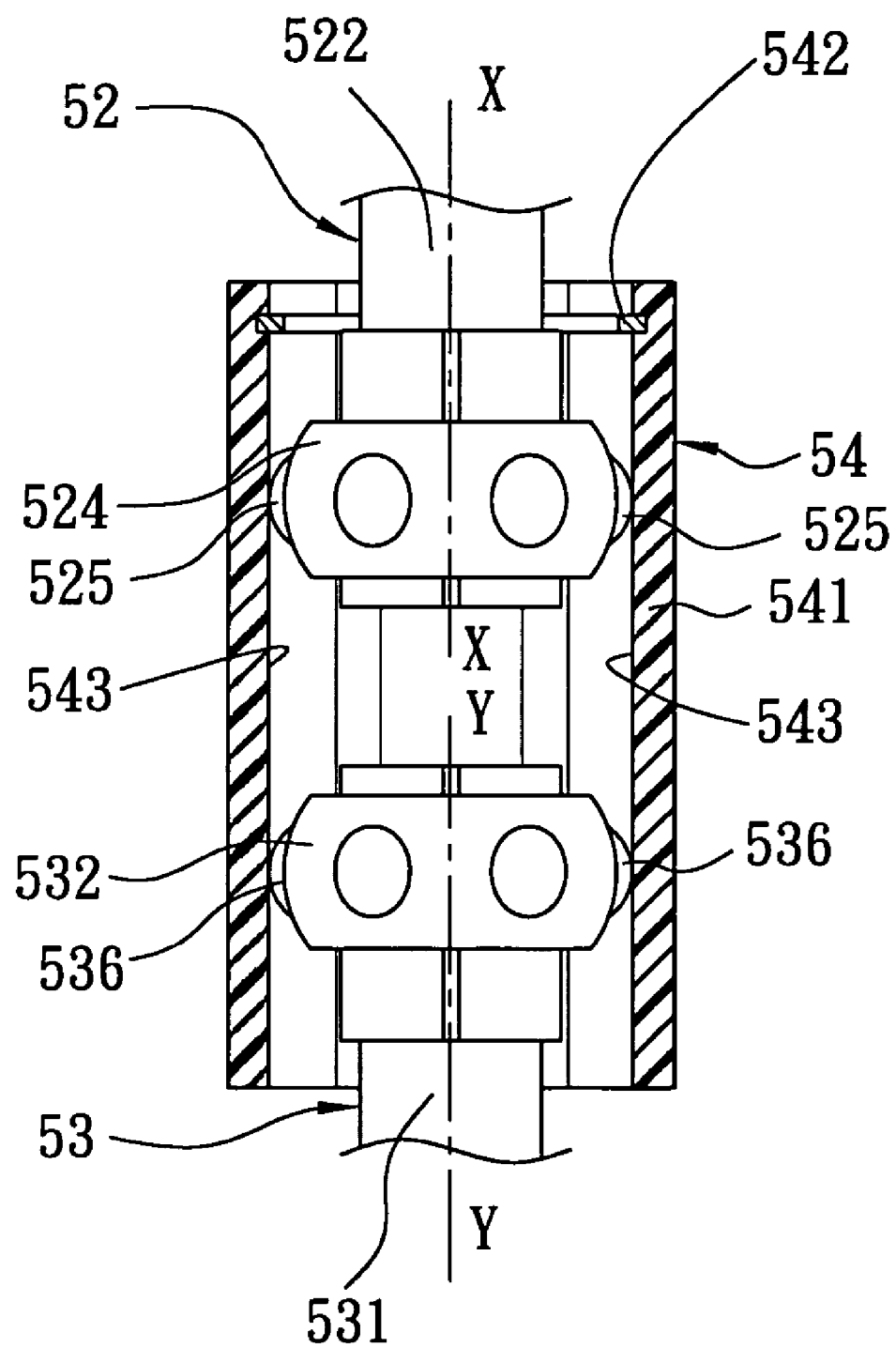
FIG. 4 is an enlarged fragmentary assembled, partly sectional view of the preferred embodiment, illustrating the first transmission unit at a first position, where a first drive axis is aligned with a second drive axis.
Figure 5:
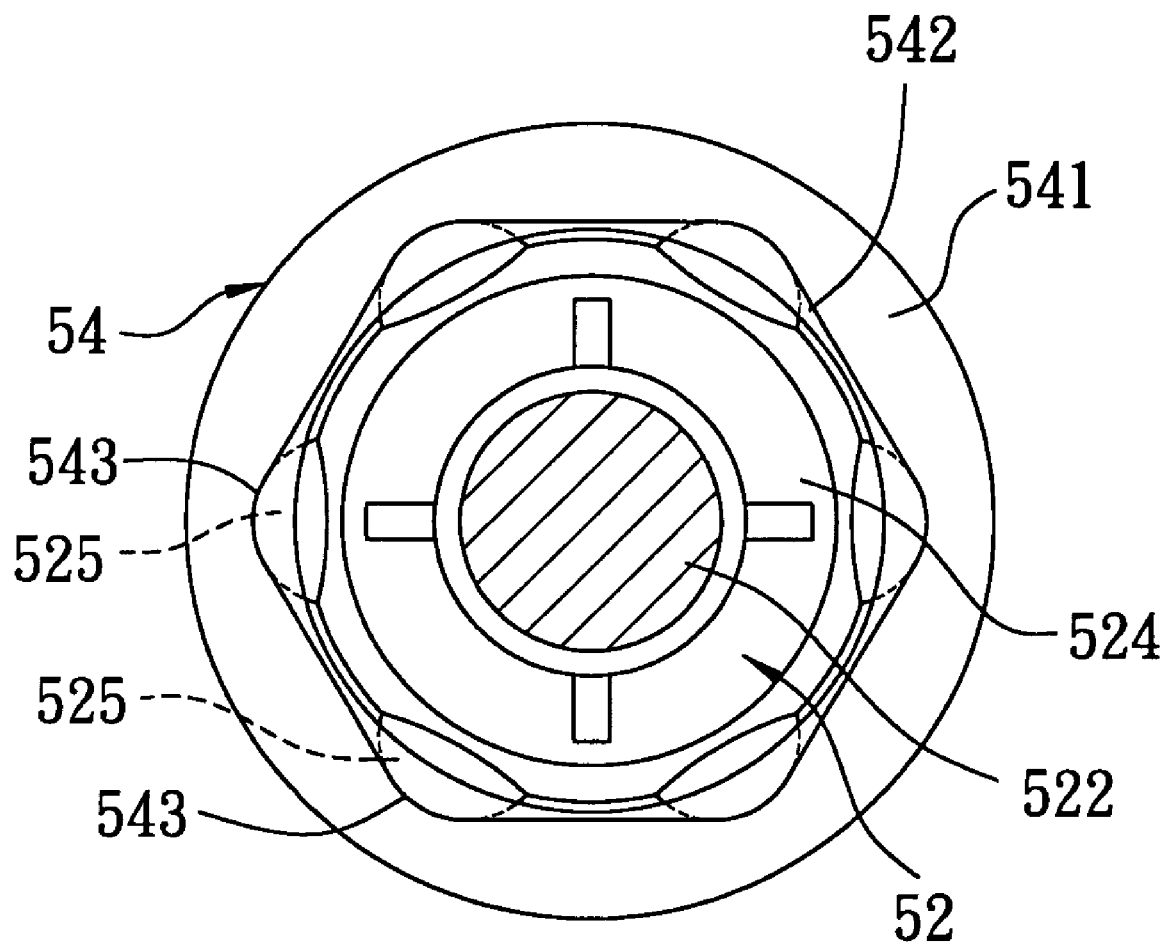
FIG. 5 is an enlarged fragmentary top sectional view of the preferred embodiment as illustrated in FIG. 4.

As shown in FIGS. 3 to 5, the coupling member 54 enables the drive power from the drive unit 2 to be transmitted to the rotary support 4 through the first transmission unit 52, the coupling member 54, and the second transmission unit 53 when the first transmission unit 52 is at the first position. The coupling member 54 includes a sleeve 541 having the first and second drive shafts 522, 531 extending therein and further having the first and second bearing components 524, 532 disposed therein, and a stop 542 for preventing the sleeve 541 from falling off the first and second bearing components 524, 532.

The sleeve 541 has an inner wall surface 545 that confines a non-circular sleeve hole 546 formed with a plurality of corners 543. Each of the first and second bearing components 524, 532 is provided with a plurality of bearing balls 525, 536 that engage the inner wall surface 545 of the sleeve 541 at corresponding ones of the corners 543 of the sleeve hole 546 so as to permit the drive power from the drive unit 2 to be transmitted to the rotary support 4 through the transmission device 5 when the first transmission unit 52 is at the first position. In this embodiment, the stop 542 is in the form of a ring that is mounted in the sleeve 541 and that is disposed above the first bearing component 524. The ring confines a ring hole 5421 that is smaller than a cross-sectional size of the first bearing component 524.

As shown in FIG. 1, FIG. 2, and FIG. 4, the upper housing portion 12 must be in the first state such that the first transmission unit 52 is at the first position when it is desired to activate the drive unit 2. When activated, the drive unit 2 simultaneously drives the first and third transmission units 52, 51 of the transmission device 5. The drive power of the drive unit 2 is then transmitted to the beaters 31 of the food processing tool 3 through the third transmission unit 51 for driving rotation of the beaters 31 in a first direction, and to the second transmission unit 53 through the first transmission unit 52 and the coupling member 54 for driving rotation of the rotary support 4 in a second direction reverse to the first direction. Therefore, the container 6 that is disposed on top of the rotary support 4, and the beaters 31 that extend into the container 6 rotate in opposite directions, such that the food contained in the container 6 is whisked evenly and efficiently.

Figure 7:
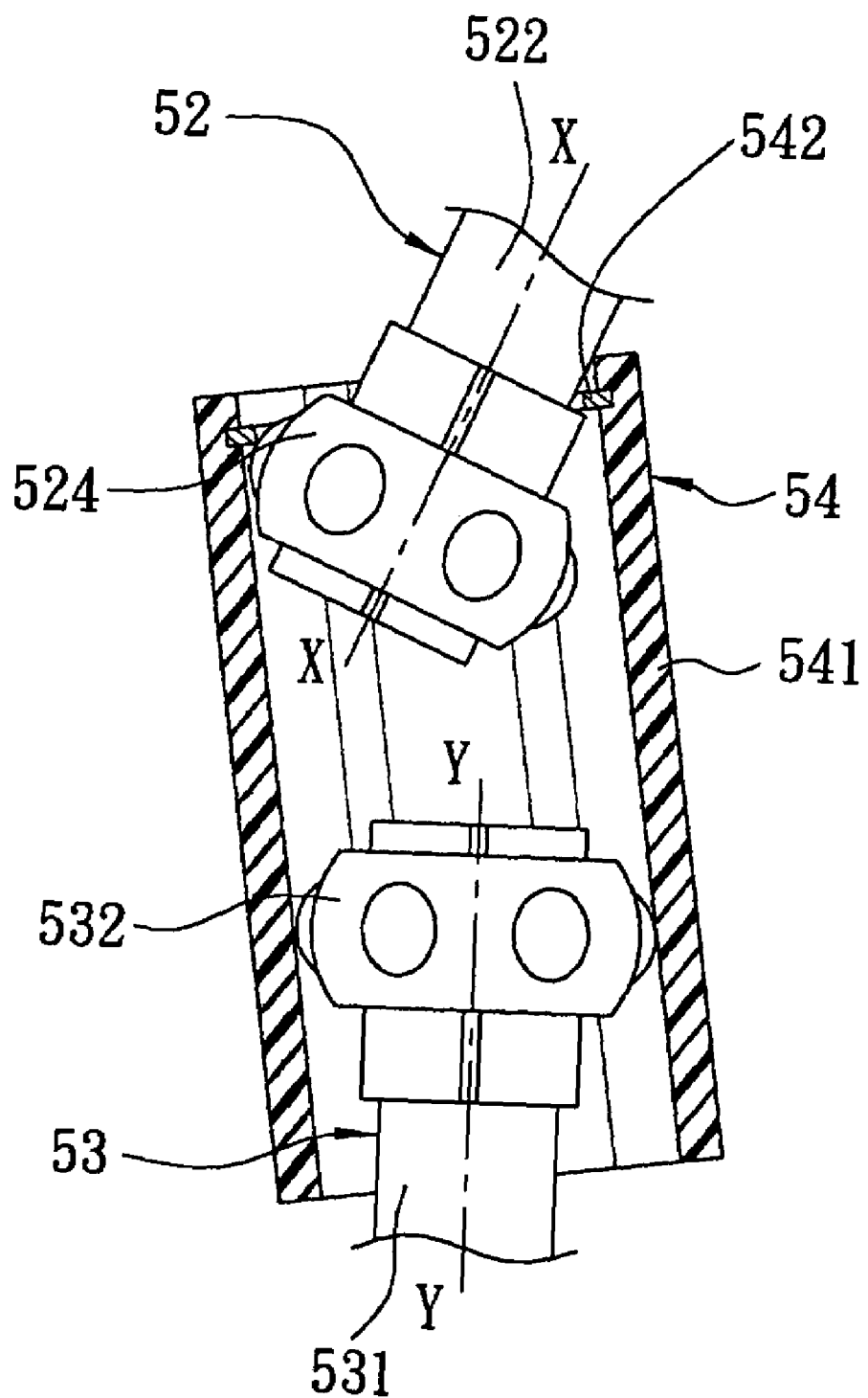
FIG. 7 is an enlarged fragmentary assembled, partly sectional view of the preferred embodiment, illustrating the first transmission unit at the second position, where the first drive axis forms an angle with the second drive axis.

As shown in FIG. 6 and FIG. 7, when the drive unit 2 is deactivated, in order to put the container 6 on or remove the container 6 from the rotary support 4, the upper housing portion 12 is moved from the first state to the second state, where the upper housing portion 12 is pivoted away from the lower housing portion 11, such that the beaters 31 do not block the transfer of the container 6. At the same time, the first transmission unit 52 and the coupling member 54 pivot relative to the second transmission unit 53 due to the movement of the upper housing portion 12 relative to the lower housing portion 11, such that the first transmission unit 52 is at the second position. In particular, the first and second bearing components 524, 532 slide in the sleeve 541 of the coupling member 54, such that the first drive axis (X) of the first drive shaft 524 forms an angle with the second drive axis (Y) of the second drive shaft 532, while the sleeve 541 is also tilted with respect to the second drive axis (Y), as best shown in FIG. 7.

As described, the food processor according to the present invention is provided with a transmission device 5 that is capable of transmitting the drive power from the drive unit 2 to various parts of the food processor using only one motor 20 to reduce the production cost and power consumption of the food processor, while maintaining high efficiency in processing food.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A food processor comprising:
    a drive unit;
    a food processing tool driven rotatably by said drive unit;
    a rotary support disposed below said food processing tool; and
    a transmission device including:
        a first transmission unit coupled to and driven rotatably by said drive unit, said first transmission unit defining a first drive axis;
        a second transmission unit coupled to said rotary support for driving rotation of said rotary support, said second transmission unit defining a second drive axis; and
        a coupling member permitting movement of said first transmission unit to said second transmission unit, said coupling member permitting movement of said first transmission unit relative to said second transmission unit from a first portion, where the first drive axis is aligned with the second drive axis, to a second position, where the first drive axis forms an angle with the second drive axis,
        said coupling member enabling drive power from said drive unit to be transmitted to said rotary support through said first transmission unit, said coupling member, and said second transmission unit when said first transmission unit is at the first position;
        wherein said first transmission unit includes a first drive shaft that extends along the first drive axis and that has a bottom end, and a first bearing component mounted to said bottom end of said first drive shaft;
        wherein said second transmission unit is disposed below said first transmission unit, and includes a second drive shaft that extends along the second drive axis and that has a top end, and a second bearing component mounted to said top end of said second drive shaft;
        wherein said coupling member includes a sleeve having said first and second drive shafts extending therein and further having said first and second bearing components disposed therein;
        wherein said sleeve has an inner well surface that confines a non-circular sleeve hole, said first and second bearing components engaging said inner wall surface of said sleeve so as to permit the drive power from said drive unit to be transmitted to said rotary support through said transmission device when said first transmission unit is at the first position; and
        wherein said sleeve hole is formed with a plurality of corners, and each of said first and second bearing components is provided with a plurality of bearing balls that engage said inner wall surface of said sleeve at corresponding ones of said corners of said sleeve hole when said first transmission unit is at the first position.

2. The food processor as claimed in claim 1, wherein said coupling member further includes a stop for preventing said sleeve from falling off said first and second bearing components.

3. The food processor as claimed in claim 2, wherein said step is in the form of a ring that is mounted in said sleeve and that is disposed above said first bearing component.

4. The food processor as claimed in claim 3, wherein said ring confines a ring hole that is smaller than a cross-sectional size of said first bearing component.

5. The food processor as claimed in claim 1, wherein said first transmission unit further includes:
    a worm that is coupled to and driven rotatably by said drive unit; and
    a worm gear that is mounted on said first drive shaft and that meshes with said worm.

6. The food processor as claimed in claim 1, wherein said second transmission unit further includes:
    a first worm provided on said second drive shaft;
    a transmission shaft having a first end portion provided with a first worm gear that meshes with said first worm, and a second end portion provided with a second worm; and
    a second worm gear that meshes with said second worm and that is connected to said rotary support.

7. The food processor as claimed in claim 1, wherein said drive unit is a motor.

8. The food processor as claimed in claim 1, further comprising a housing that includes:
    a lower housing portion that has said coupling member and said second transmission unit disposed therein; and
    an upper housing portion that has said drive unit and said first transmission unit disposed therein;
    said upper housing portion being connected pivotally to said lower housing portion and being movable relative to said lower housing portion from a first state, where said first transmission unit is at the first position, to a second state, where said first transmission unit is at the second position.

9. The food processor as claimed in claim 1, wherein said transmission device further includes a third transmission unit coupled to said drive unit and said food processing tool for transmitting the drive power of said drive unit to said food processing tool.

10. The food processor as claimed in 9, wherein:
    said food processing tool includes two beaters,
    said third transmission unit including a worm that is coupled to and driven by said drive unit, and two worm gears that mesh with said worm and that are connected to said beaters, respectively.

11. A transmission device for a food processor that includes a drive unit, said transmission device comprising:
    a first transmission unit that is adapted to be driven rotatably by said drive unit and that defines a first drive axis;
    a second transmission unit that defines a second drive axis; and
    a coupling member that couples said first transmission unit to said second transmission unit,
    said coupling member that couples said first transmission unit relative to said second transmission unit from a first position, where the first drive axis is aligned with the second drive axis, to a second position, where the first drive axis forms an angle with the second drive axis,
    said coupling member enabling drive power from the drive unit to be transmitted to said second transmission unit though said first transmission unit and said coupling member when said first transmission unit is at the first position;
    wherein said first transmission unit includes a first drive shaft that extends along the first drive axis and that has a bottom end, and a first bearing component mounted to said bottom end of said first drive shaft;
    wherein said second transmission unit is disposed below said first transmission unit, and includes a second drive shaft that extends along the second drive axis and that has a top end, and a second bearing component mounted to said top end of said second drive shaft; and wherein said coupling member includes a sleeve having said first and second drive shaft extending therein and further having said first and second bearing component disposed therein;

wherein said sleeve has an inner wall surface that confines a non-circular sleeve hole, said first and second bearing components engaging said inner wall surface of said sleeve so as to permit the drive power from the drive unit to be transmitted to said second transmission unit when said first transmission unit is at the first position; and wherein said sleeve hole is formed with a plurality of corners, and each of said first and second bearing components is provided with a plurality of bearing balls that engage said inner wall surface of said sleeve at corresponding ones of said corners of said sleeve hole when said first transmission unit is at the first position.

12. The transmission device as claimed in claim 11, wherein said coupling member further includes a stop for preventing said sleeve from falling off said first and second bearing components.

13. The transmission device as claimed in claim 12, wherein said stop is in the form of a ring that is mounted in said sleeve and that is disposed above said first bearing component.

14. The transmission device as claimed in claim 13, wherein said ring confines a ring hole that is smaller than a cross-sectional size of said first bearing component.

* * * * *